United States Patent
Uchida et al.

(10) Patent No.: US 10,672,100 B2
(45) Date of Patent: Jun. 2, 2020

(54) IMAGE PROCESSING APPARATUS AND IMAGE PROCESSING METHOD

(71) Applicant: Hitachi Automotive Systems, Ltd., Hitachinaka-shi, Ibaraki (JP)

(72) Inventors: Yusuke Uchida, Tokyo (JP); Tetsuya Yamada, Tokyo (JP); Shigeru Matsuo, Tokyo (JP); Manabu Sasamoto, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 104 days.

(21) Appl. No.: 16/073,328

(22) PCT Filed: Oct. 12, 2016

(86) PCT No.: PCT/JP2016/080184
§ 371 (c)(1),
(2) Date: Jul. 26, 2018

(87) PCT Pub. No.: WO2017/163468
PCT Pub. Date: Sep. 28, 2017

(65) Prior Publication Data
US 2019/0035052 A1    Jan. 31, 2019

(30) Foreign Application Priority Data

Mar. 25, 2016   (JP) .................................. 2016-061280

(51) Int. Cl.
*G06T 1/60*   (2006.01)
*H04N 5/232*  (2006.01)
(Continued)

(52) U.S. Cl.
CPC .................. *G06T 1/60* (2013.01); *G06T 1/20* (2013.01); *G06T 5/00* (2013.01); *G06T 5/006* (2013.01); *G06T 5/20* (2013.01); *H04N 5/232* (2013.01)

(58) Field of Classification Search
CPC ..................................... G06T 1/20; G06T 1/60
See application file for complete search history.

(56) References Cited

U.S. PATENT DOCUMENTS

| 2006/0188172 A1 | 8/2006 | Higurashi et al. |
| 2010/0321538 A1 | 12/2010 | Nakazono et al. |

(Continued)

FOREIGN PATENT DOCUMENTS

| JP | 2001-101396 A | 4/2001 |
| JP | 2005-044098 A | 2/2005 |

(Continued)

OTHER PUBLICATIONS

International Search Report and Written Opinion for related International Patent Application No. PCT/JP2016/080184, dated Nov. 8, 2016; 5 pages; English translation provided.

(Continued)

*Primary Examiner* — Wen W Huang
(74) *Attorney, Agent, or Firm* — Procopio, Cory, Hargreaves & Savitch LLP

(57) ABSTRACT

An apparatus determines a second pixel range of an uncorrected image necessary to generate a first pixel range having pixels in a preset range of a corrected image, including a cache unit determining the second pixel range and reading and holding the second pixel range from memory before executing correction. Correspondences indicating positions of the uncorrected image corresponding to positions of pixels of the corrected image, respectively, are preset. The cache unit specifies a position of the uncorrected image (Continued)

corresponding to a pixel of one of four corners of a rectangular third pixel range including the first pixel range based on the correspondence, specifies pixel ranges of the uncorrected image necessary for pixel value generation, respectively, at the four corners of the third pixel range based on the specified position, and determines a pixel range including a convex set including the specified pixel ranges as the second pixel range.

8 Claims, 5 Drawing Sheets

(51) Int. Cl.
*G06T 1/20* (2006.01)
*G06T 5/00* (2006.01)
*G06T 5/20* (2006.01)

(56) References Cited

U.S. PATENT DOCUMENTS

| | | | |
|---|---|---|---|
| 2011/0122298 A1 | 5/2011 | Takahashi et al. | |
| 2011/0153996 A1* | 6/2011 | Bader | G06T 1/20 |
| | | | 712/222 |
| 2013/0236118 A1 | 9/2013 | Takahashi | |
| 2014/0009568 A1* | 1/2014 | Stec | G06T 5/006 |
| | | | 348/36 |

FOREIGN PATENT DOCUMENTS

| | | |
|---|---|---|
| JP | 2005-045513 A | 2/2005 |
| JP | 2009-043060 A | 2/2009 |
| JP | 2011-002940 A | 1/2011 |
| JP | 2011-113234 A | 6/2011 |
| JP | 2011-211274 A | 10/2011 |
| JP | 2013-186624 A | 9/2013 |

OTHER PUBLICATIONS

Notification of Reasons for Refusal for related Japanese Patent Application No. 2016-061280, dated Feb. 5, 2018; English translation provided; 6 pages.

* cited by examiner

IMAGE PROCESSING APPARATUS AND IMAGE PROCESSING METHOD

CROSS-REFERENCE TO RELATED APPLICATIONS

This application is a U.S. National Stage entry of PCT Application No: PCT/JP2016/080184 filed Oct. 12, 2016, which is based upon and claims the benefit of priority from Japanese Patent Application No. 2016-061280, filed on Mar. 25, 2016, the entire contents of which are incorporated herein by reference.

TECHNICAL FIELD

The present invention relates to an image processing apparatus and an image processing method.

BACKGROUND ART

Since a lens of a camera has distortion characteristics, a generated image contains distortion. Further, an effect, such as enlargement, reduction, rotation, and shearing, occurs depending on an installation condition of a capturing device, and generated image data further contains a difference from a real image. In addition, even when reproducing a recorded image, there is a possibility that the reproduced image has an effect, such as enlargement, reduction, rotation, and shearing, depending on an installation situation of a reproduction device. The image processing apparatus that corrects such a difference between the real image and the generated image determines pixels of an uncorrected image necessary for generation of pixels of a corrected image, respectively, reads the determined pixels, and performs image processing.

In general, a storage device storing image data tends to be more expensive as the device has a higher processing speed. Accordingly, a low-speed storage device is used in order to store large image data corresponding to one frame at low cost. In this case, the processing speed is lowered in the above-described image correction processing of repeatedly reading the same image data.

An example of the background art in this technical field is JP 2011-211274 A (PTL 1). This publication describes that "an image display device includes a frame image storage unit, a block image storage unit that has a plurality of block regions and stores block image data, a correction processing unit that generates corrected pixel data using the block image data, a display unit that displays the corrected frame image, a determination unit that issues an acquisition request for acquiring the block image data to be used for generation of first corrected pixel data, a block image prediction unit that issues an acquisition request for acquiring the block image data to be used for generation of second corrected pixel data generated after the first corrected pixel data, and a block image acquisition unit that acquires block image data designated in preference to the acquisition request issued by the block image prediction unit when the acquisition request is issued by the determination unit" (see Abstract).

CITATION LIST

Patent Literature

PTL 1: JP 2011-211274 A

SUMMARY OF THE INVENTION

Technical Problem

In the technique described in PTL 1, uncorrected pixels necessary for generating corrected pixels consisting of a plurality of units of pixel processing are predicted prior to image processing, and the uncorrected pixels that have been predicted are read from a low-speed storage device and stored, in advance, in a high-speed storage device.

However, the technique described in PTL 1 executes a process of determining a necessary uncorrected pixel for each unit of image processing, and reads the determined uncorrected pixels. Accordingly, the technique described in PTL 1 requires the process of determining pixels to be read for the number of times corresponding to the number of units of image processing, and it takes a lot of time to determine the pixels to be read. Therefore, an object of an aspect of the present invention is to determine pixels to be read at high speed.

Solution to Problem

In order to solve the above problem, an aspect of the present invention adopts the following configuration. An image processing apparatus that determines a second pixel range of an uncorrected image necessary for generating a first pixel range consisting of pixels in a preset range of a corrected image, the image processing apparatus including a memory that holds the uncorrected image, a cache unit that determines the second pixel range, reads the second pixel range from the memory, and holds the read second pixel range, and a correction processing unit that acquires the second pixel range from the cache unit and executes correction on the acquired second pixel range to generate the first pixel range, in which correspondences indicating positions of the uncorrected image corresponding to positions of pixels of the corrected image, respectively, are preset, and the cache unit specifies a position of the uncorrected image corresponding to a pixel at one of four corners of a rectangular third pixel range including the first pixel range based on the correspondence, specifies pixel ranges of the uncorrected image necessary for generation of pixel values of pixels, respectively, at the four corners of the third pixel range based on the specified position, determines a pixel range that includes a convex set including all the specified pixel ranges as the second pixel range, and reads the second pixel range from the memory before executing the correction by the correction processing unit.

Advantageous Effects of Invention

According to an aspect of the present invention, it is possible to determine the uncorrected pixels necessary for generation of a corrected pixel group at high speed.

Other objects, configurations, and effects which have not been described above become apparent from embodiments to be described hereinafter.

DESCRIPTION OF EMBODIMENTS

Figure 1:
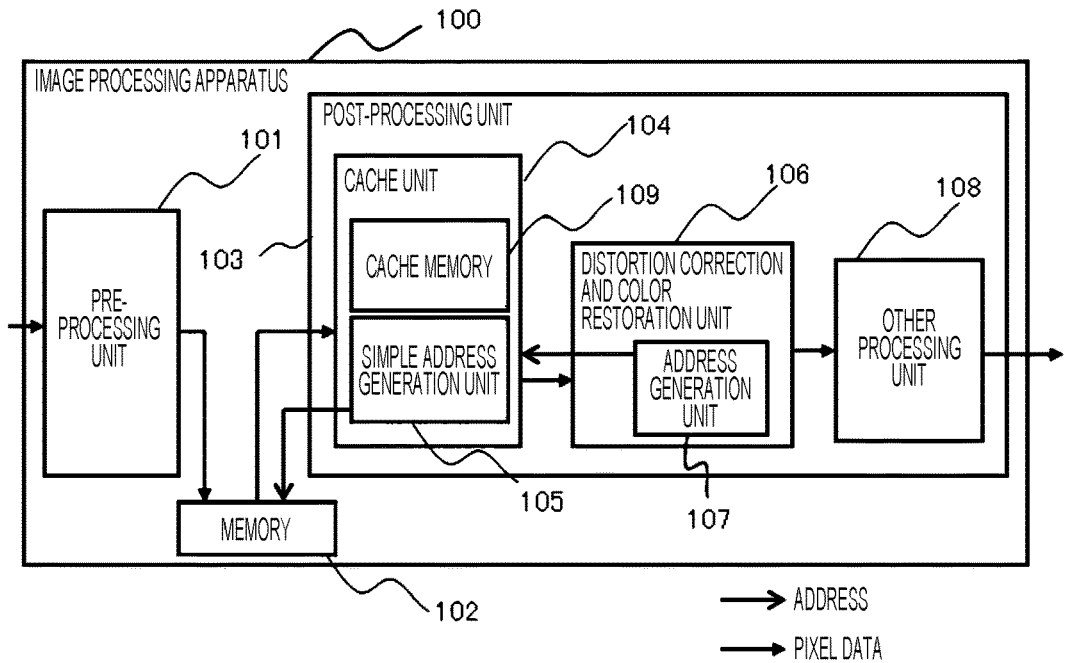
FIG. 1 is a block diagram illustrating an example of an image processing apparatus according to a first embodiment.

Hereinafter, embodiments of the present invention will be described with reference to the attached drawings. It should be noted that the embodiments are merely examples for realizing the present invention and do not limit a technical scope of the present invention. In the respective drawings, the same reference numerals are assigned to the common configurations.

First Embodiment

FIG. 1 is a block diagram illustrating a configuration example of an image processing apparatus according to the present embodiment. An image processing apparatus 100 performs image processing including distortion correction processing of an image captured by a camera. The image processing apparatus 100 includes, for example, a pre-processing unit 101, a memory 102, and a post-processing unit 103. The post-processing unit 103 includes, for example, a cache unit 104, a distortion correction and color restoration unit 106, and an other processing unit 108.

The respective units included in the image processing apparatus 100 are realized by a hardware circuit, for example, as a field programmable gate array (FPGA), an application specific integrated circuit (ASIC), or the like.

Incidentally, the respective units included in the image processing apparatus 100 may be realized by a processor (not illustrated) operating according to a program stored in the memory 102. For example, the processor operates according to a pre-processing program, thereby functioning as the pre-processing unit 101. This applies to other units. Further, the processor may also operate as a functional unit that realizes each of a plurality of processes executed by each program.

The pre-processing unit 101 receives an input of image data, performs pre-processing on the input image data, and stores the pre-processed image data in the memory 102. The pre-processing is arithmetic processing for each pixel of the image data, and includes, for example, luminance adjustment for each pixel. Hereinafter, an image that has been subjected to the pre-processing and not been subjected to processing using the distortion correction and color restoration unit 106 will be referred to as an uncorrected image.

The memory 102 stores the uncorrected image. When the image processing apparatus 100 includes a processor, the memory 102 may store a program to cause the processor to operate as the respective units included in the image processing apparatus 100. The memory 102 includes a ROM which is a nonvolatile storage element and a RAM which is a volatile storage element. The ROM stores an invariable program (for example, BIOS) and the like. The RAM is a high-speed and volatile storage element such as a dynamic random access memory (DRAM).

The post-processing unit 103 reads uncorrected image data stored in the memory 102, performs processing including computation between pixels, and outputs the processed data to an external device or the like. The post-processing unit 103 includes, for example, a cache unit 104, a distortion correction and color restoration unit 106, and an other processing unit 108. Since the processing performed by the post-processing unit 103 includes computation among a plurality of pixels, the post-processing unit 103 reads the same pixel from the memory 102 a plurality of times during processing of the entire input image in the computation among the plurality of pixels. Thus, the amount of data to be transferred from the memory 102 to the post-processing unit 103 may increase. Therefore, the post-processing unit 103 includes the cache unit 104 in order to alleviate the increase in the data transfer amount.

The cache unit 104 includes, for example, a simple address generation unit 105 and a cache memory 109. The cache unit 104 predicts image data required by the distortion correction and color restoration unit 106, reads the predicted image data from the memory 102, and stores the read data in the cache memory 109. The simple address generation unit 105 predicts a pixel required by the distortion correction and color restoration unit 106, and determines a pixel to be read from the memory 102 by the cache unit 104. A specific prediction method will be described later. The cache memory 109 is, for example, a storage device such as an SRAM with a smaller capacity and is higher speed than the memory 102, and temporarily stores data.

The distortion correction and color restoration unit 106 includes, for example, an address generation unit 107. The distortion correction and color restoration unit 106 performs distortion correction processing and color restoration processing on each pixel of the uncorrected image. The distortion correction and color restoration unit 106 requests a pixel necessary for the processing to the cache unit 104. The address generation unit 107 generates an address of a pixel that is requested by the distortion correction and color restoration unit 106 to the cache unit 104. A specific example of address generation processing performed by the address generation unit 107 will be described later. The cache unit 104 transfers the pixel that has been requested by the distortion correction and color restoration unit 106 from the image data stored in the cache memory 109 to the distortion correction and color restoration unit 106.

The distortion correction and color restoration unit 106 executes the distortion correction processing and the color restoration processing using the transferred pixel, and transfers data of the corrected image, in other words an image for which the distortion correction processing and the color restoration processing have been completed, to the other processing unit 108. The other processing unit 108 performs general image processing such as filter processing on the corrected image. The other processing unit 108 outputs the image data that has been subjected to the processing by the other processing unit 108, as an output of the image processing apparatus 100, to an external device or the like.

Figure 2:
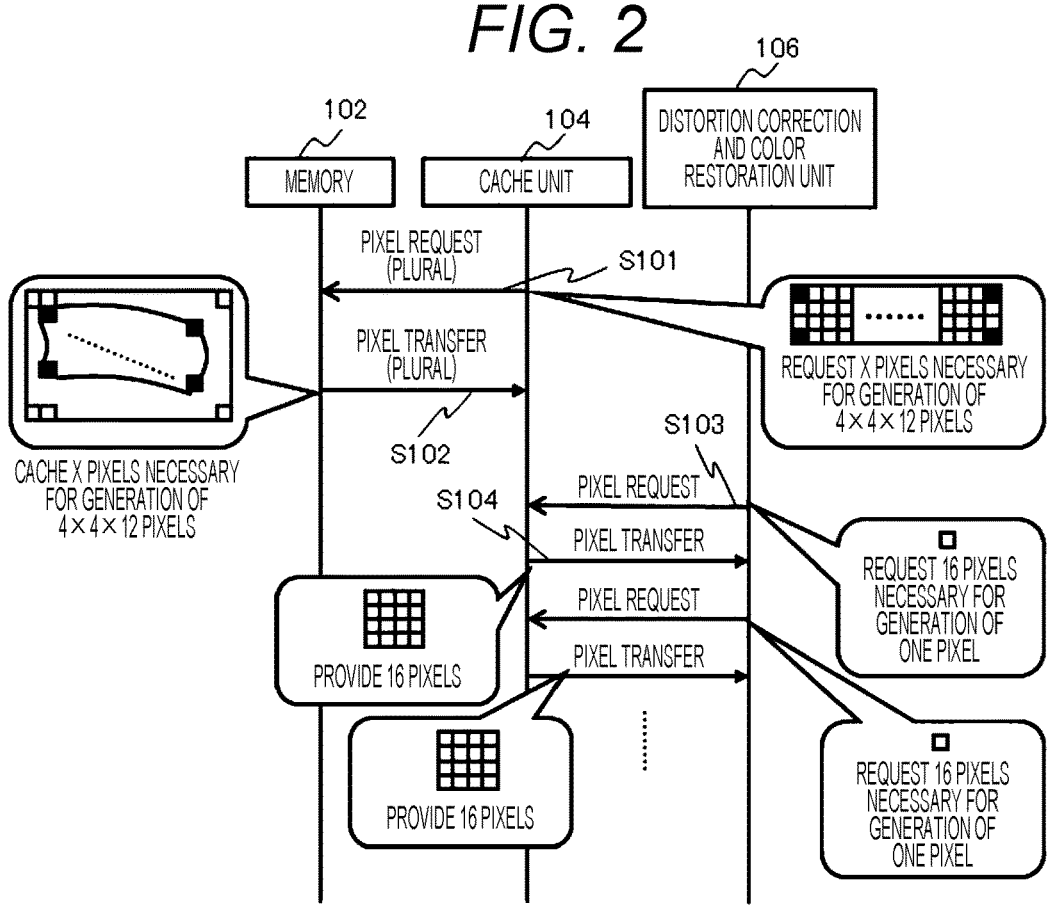
FIG. 2 is a sequence diagram illustrating an example of pixel data transfer processing according to the first embodiment.

FIG. 2 is a sequence diagram illustrating an example of pixel data transfer processing from the memory 102 to the cache unit 104 and from the cache unit 104 to the distortion correction and color restoration unit 106. Hereinafter, a pixel of the uncorrected image will be referred to as an uncorrected pixel, and a pixel of the corrected image will be referred to as a corrected pixel. In addition, the number of pixels of the corrected image generated at one time of the distortion correction and color restoration processing performed by the distortion correction and color restoration unit 106 will be referred to as a unit of processing. The unit of processing is one pixel in the example of FIG. 2.

Each pixel of the corrected image thus generated belongs to one of a plurality of preset pixel groups. Incidentally, each pixel group consists of pixels of a plurality of units of processing. For example, each pixel included in each pixel group is adjacent to one or more other pixels included in the pixel group, that is, each pixel group is a continuous region in which a plurality of pixels is connected. In the example of FIG. 2, each pixel group consists of 4×4×12=192 units of processing (=192 pixels).

Prior to reception of a pixel request from the distortion correction and color restoration unit 106, the simple address generation unit 105 predicts pixels of the uncorrected image necessary for generation of a pixel group out of the plurality of pixel groups and requests the transfer of the pixels to the memory 102 (S101). The simple address generation unit 105 predicts uncorrected pixels necessary for generation of all the pixels of the pixel group by simple computation, instead of sequentially predicting an uncorrected pixel necessary for generation of a pixel for each pixel per unit of processing of the pixel group as in the conventional example. Details of prediction processing will be described later.

The memory 102 transfers the uncorrected pixels corresponding to the pixel request from the cache unit 104 to the cache unit 104, and the cache unit 104 stores the uncorrected pixels that have been transferred in the cache memory 109 (S102).

Thereafter, the distortion correction and color restoration unit 106 requests the cache unit 104 to transfer the uncorrected pixels necessary for generation of the pixels of the corrected image per unit of processing (S103). In the example of FIG. 2, one unit of processing is one pixel, and the pixels of the uncorrected image necessary for generation of the pixel are sixteen pixels. An example of a method of determining the pixels of the uncorrected image necessary for generation of a corrected pixel per unit of processing will be described later. Incidentally, such a determination method is preset, for example.

The cache unit 104 receives the pixel request from the distortion correction and color restoration unit 106 and provides the requested pixels (S104). The processes in Steps S103 and S104 are sequentially executed for all the pixels included in the pixel group in Step S101. In addition, the processes in Steps S101 to S104 are sequentially executed for all the pixel groups of the corrected image, whereby the corrected image is generated.

Incidentally, before the repetition of the processes in Step S103 and Step S104 for a certain pixel group is ended, the cache unit 104 may perform the process in Step S101 for the next pixel group.

Figure 3:
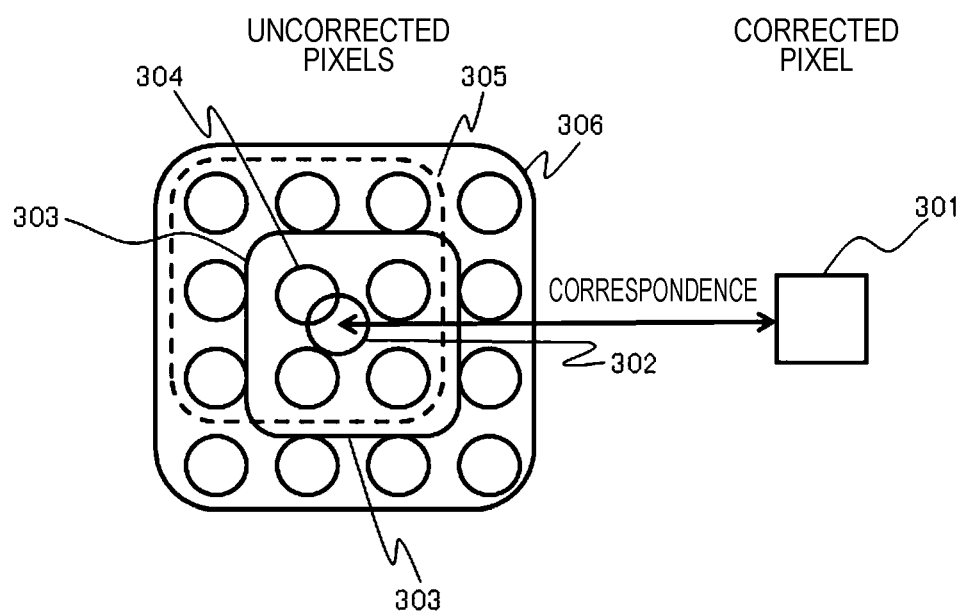
FIG. 3 is an example of uncorrected pixels necessary for generation of a corrected pixel according to the first embodiment.

FIG. 3 is an explanatory view illustrating an example of uncorrected pixels necessary for generation of a corrected pixel. The example of FIG. 3 illustrates that an uncorrected pixel group 306 consisting of sixteen uncorrected pixels is necessary in order to allow the distortion correction and color restoration unit 106 to generate a corrected pixel 301 which is the one corrected pixel.

A point 302 is a position obtained by distortion, enlargement, reduction, rotation, shearing, or translation of the corrected pixel 301 depending on a condition at the time of capturing such as lens distortion and inclination of the camera. Coordinate transformation characteristics depending on the lens distortion, the inclination of the camera, or the like are preset. That is, a correspondence between a position of the corrected pixel to be generated and a position on the uncorrected image is preset. That is, the simple address generation unit 105 can calculate coordinates of the point 302 using the coordinate conversion characteristics and coordinates of the corrected pixel 301 in advance.

Since the arrangement of pixels on an image is discrete, it is very likely that the uncorrected pixel does not exist at the position of the point 302, that is, it is very likely that there is no uncorrected pixel perfectly matching the point 302. Therefore, the simple address generation unit 105 specifies an uncorrected pixel group 303, for example, consisting of four uncorrected pixels. For example, the distortion correction and color restoration unit 106 determines a color of the corrected pixel 301 by linear interpolation using each pixel of the uncorrected pixel group 303.

The uncorrected pixel group 303 consists of a pixel 304 having coordinates made up of integer parts of x and y coordinates of the point 302, a pixel existing at a position obtained by adding the coordinates of the pixel 304 by one in the x-axis direction, a pixel existing at a position obtained by adding the coordinate of the pixel 304 by one in the y-axis direction, and a pixel existing at a position obtained by adding the coordinates of the pixel 304 by one in each of the x-axis direction and y-axis direction. Incidentally, it is assumed that each pixel of the uncorrected image is positioned at integer coordinates in an orthogonal coordinate system in which the right direction is a positive direction of an x coordinate and the downward direction is a positive direction of a y coordinate.

When the uncorrected image is a Bayer image, for example, an uncorrected pixel group 305 consisting of nine pixels including the pixel 304 and eight pixels around the pixel 304 is necessary in order to allow the distortion correction and color restoration unit 106 to determine a color (pixel value) of the pixel 304, for example. Therefore, the simple address generation unit 105 specifies an address of the uncorrected pixel group 305. Incidentally, the uncorrected pixel group 305 may be, for example, a cross-shaped uncorrected pixel group consisting of the pixel 304 and four pixels on an upper, lower, right, and left sides of the pixel 304. A method of specifying the uncorrected pixel group necessary for generation of the corrected pixel 301 based on the pixel 304 is preset, for example.

The Bayer image generally has a format in which each pixel represents intensity of only one color among red, green, and blue. Therefore, in order for conversion into an RGB format in which each of pixels of the Bayer image is represented by a color having intensity of each component of red, green, and blue, not only a relevant pixel but also eight pixels around the relevant pixel are necessary.

Similarly, determination of a color of each of the other three pixels included in the uncorrected pixel group 303 also requires nine pixels including those at the periphery of a relevant pixel. Therefore, the uncorrected pixel group 306 consisting of sixteen pixels is necessary in order for the distortion correction and color restoration unit 106 to determine the color of the point 302 by interpolation. Therefore, the simple address generation unit 105 determines the uncorrected pixels necessary for generation of the corrected pixel 301 as the uncorrected pixel group 306, and specifies the addresses of the respective pixels of the uncorrected pixel group 306.

Incidentally, when each pixel of the uncorrected image is expressed, in advance, in the RGB format, the address generation unit 107 may specify only the uncorrected pixel group 303 since the distortion correction and color restoration unit 106 can generate the corrected pixel 301 from the uncorrected pixel group 303. Incidentally, the address generation unit 107 also specifies the address of the uncorrected pixel requested in Step S103 using the same method as the above-described method.

Figure 4A:
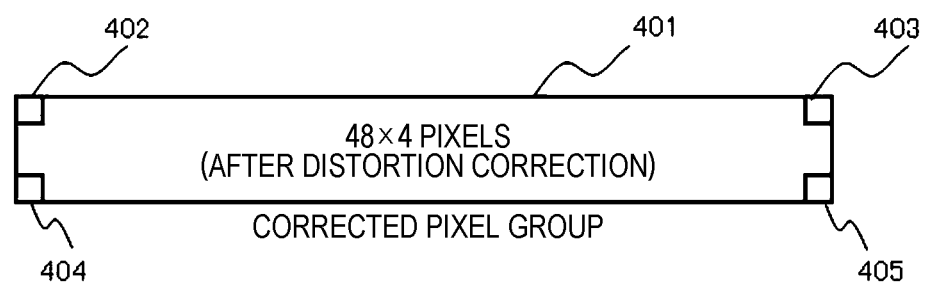
FIG. 4A is an example of a pixel group of a corrected image according to the first embodiment.
Figure 4B:
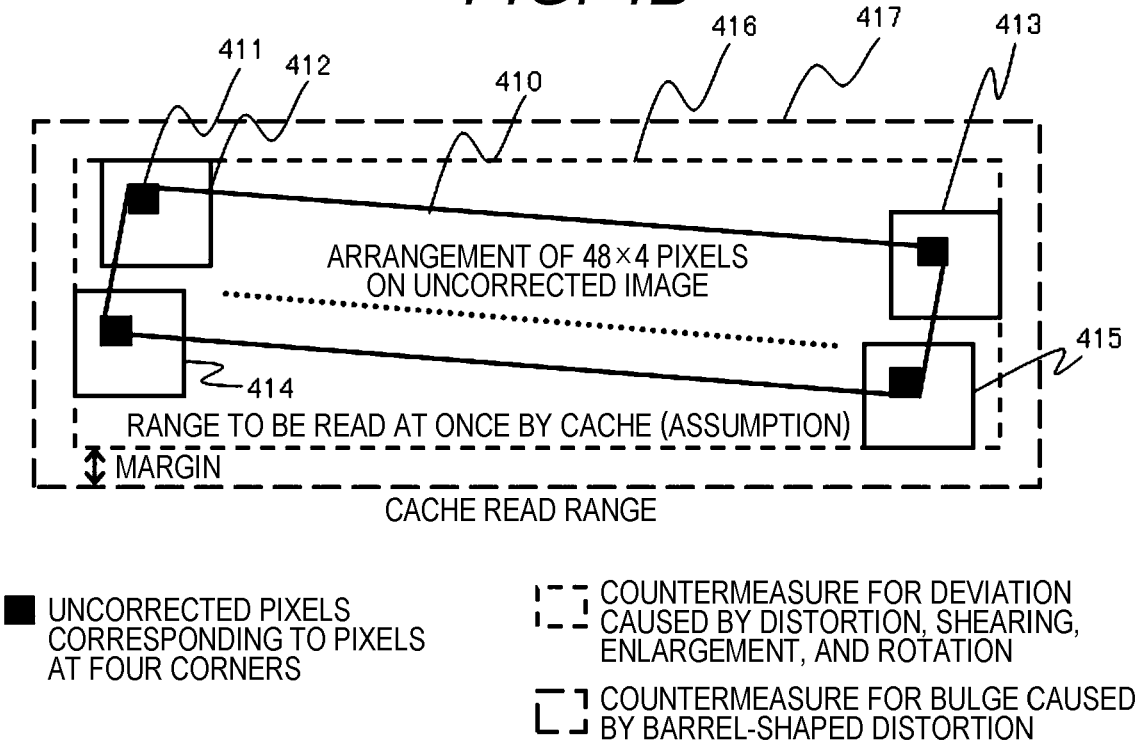
FIG. 4B is an example of a pixel range of an uncorrected image necessary for generation of a corrected pixel group according to the first embodiment.

Hereinafter, an example of calculation of a pixel range of an uncorrected image necessary for generation of a pixel group of a corrected image will be described with reference to FIGS. 4A and 4B. The example of FIGS. 4A and 4B illustrates an example in which image data is a Bayer image as illustrated in the example of FIG. 3. That is, sixteen uncorrected pixels are necessary in order to generate one corrected pixel.

FIG. 4A is an example of the pixel group of the corrected image. A corrected pixel group 401 is a rectangular pixel group consisting of 48×4 pixels of the corrected image and is a pixel group out of the plurality of preset pixel groups in the example of FIG. 2. A corrected pixel 402, a corrected pixel 403, a corrected pixel 404, and a corrected pixel 405 are pixels at an upper left corner, an upper right corner, a lower left corner, and a lower right corner of the corrected pixel group 401.

FIG. 4B illustrates an example of the pixel range of the uncorrected image necessary for generation of the corrected pixel group 401. The corrected pixel group 401 corresponds to a region 410 of the uncorrected image on the memory 102 according to the conversion characteristics depending on the lens distortion, the inclination of the camera, and the like. An uncorrected pixel 411 is an uncorrected pixel having coordinates made up of the integer parts of x and y coordinates of a position of an uncorrected image corresponding to the corrected pixel 402.

As illustrated in the example of FIG. 3, sixteen pixels of the uncorrected image are necessary for generation of the corrected pixel 402. An uncorrected pixel group 412 has the sixteen uncorrected pixels necessary for generation of the corrected pixel 402. Similarly, each of an uncorrected pixel group 413, an uncorrected pixel group 414, and an uncorrected pixel group 415 has sixteen uncorrected pixels necessary for generation of each of a corrected pixel 403, a corrected pixel 404, and a corrected pixel 405.

For example, when a lens distortion characteristic is a mapping from a quadrilateral to a quadrilateral, the cache unit 104 reads pixels in a rectangular uncorrected pixel range 416, which includes the uncorrected pixel groups 412 to 415, into the cache memory 109. Incidentally, for example, two orthogonal sides of the rectangle are parallel, respectively, to coordinate axes of the uncorrected image. In addition, the rectangle is a concept including a square in the present embodiment. The distortion correction and color restoration unit 106 can generate all the pixels included in the corrected pixel group 401 using the pixels in the uncorrected pixel range 416.

For example, the simple address generation unit 105 specifies the maximum x coordinate $x_{max}$, the minimum x coordinate $x_{min}$, the maximum y coordinate $y_{max}$, and the minimum y coordinate $y_{min}$ from x and y coordinates of each pixel included in the uncorrected pixel groups 412 to 415, and determines a rectangle whose vertices are at ($x_{max}$, $y_{max}$), ($x_{max}$, $y_{min}$), ($x_{min}$, $y_{max}$), and ($x_{min}$, $y_{min}$) as the uncorrected pixel range 416.

In addition, if the distortion characteristic is not the simple mapping from the quadrilateral to the quadrilateral but contains barrel-shaped distortion, the cache unit 104 reads an uncorrected pixel range 417 obtained by adding a predetermined margin to the outside of the uncorrected pixel range 416. Even when the distortion characteristic contains the barrel-shaped distortion, the distortion correction and color restoration unit 106 can generate all the pixels included in the corrected pixel group 401 using the pixels in the uncorrected pixel range 417. Incidentally, a size of the margin is desirably set, for example, so as not to fall below a size of a portion with the largest barrel-shaped distortion among the distortion characteristics.

When the corrected pixel group 401 is not a rectangle, the simple address generation unit 105 may determine the uncorrected pixel range 416 or the uncorrected pixel range 417, for example, for a corrected pixel group which is the smallest rectangle including the corrected pixel group 401.

In addition, the uncorrected pixel range 416 and the uncorrected pixel range 417 are not necessarily rectangular. For example, the uncorrected pixel range 416 may be an uncorrected pixel range having a predetermined shape that has a convex set (for example, a convex package) including the uncorrected pixel groups 412 to 415, and the uncorrected pixel range 417 may consist of pixels in the convex set obtained by adding a predetermined margin to the outside of the uncorrected pixel range 416. Incidentally, the uncorrected pixel range having the predetermined shape that has the convex set including the uncorrected pixel groups 412 to 415 may be the convex set itself.

With the above-described processing, the cache unit 104 can pre-read the uncorrected pixels necessary to allow the distortion correction and color restoration unit 106 to generate all the pixels included in the corrected pixel group 401. In addition, the simple address generation unit 105 can determine the uncorrected pixel group to be pre-read with a small amount of calculation. Consequently, for example, it is possible to reduce the scale of an arithmetic circuit of the image processing apparatus 100.

Incidentally, when the corrected pixel group 401 is not a rectangle, the simple address generation unit 105 determines the uncorrected pixel range 416 or the uncorrected pixel range 417 with respect to a rectangle (for example, the smallest rectangle) including the corrected pixel group 401.

Incidentally, when the number of units of processing constituting the corrected pixel group 401 increases, the amount of calculation by the simple address generation unit 105 for one corrected image decreases, while the pixel range to be read into the cache, that is, the data amount to be stored in the cache increases. That is, there is a trade-off relationship between the amount of calculation and the amount of data to be stored in the cache, concerning the number of units of processing constituting the corrected pixel group 401. In addition, when the number of units of processing constituting the corrected pixel group 401 increases, the proportion of pixels that are not actually used in the distortion correction and color restoration processing among pixels to be read into the cache increases. Accordingly, the amount of transferred data to be read from the memory to the cache in order to obtain one corrected image increases. That is, there is also a trade-off relationship between the amount of calculation and the total transfer data amount to be stored in the cache, concerning the number of units of processing constituting the corrected pixel group 401. Therefore, it is preferable that a user can freely set the number of units of processing constituting the corrected pixel group 401.

Incidentally, for example, when determining a first corrected pixel group having the same shape and size as the corrected pixel group 401 and adjacent to the corrected pixel group 401 after the uncorrected pixel groups 412 to 415 have been determined, the simple address generation unit 105 may determine an uncorrected pixel range necessary for generation of the first corrected pixel group using an uncorrected pixel group selected from the uncorrected pixel groups 412 to 415.

Specifically, for example, when the first corrected pixel group is adjacent to the right side of the corrected pixel group 401, the simple address generation unit 105 determines, by the above-described method, an uncorrected pixel group consisting of sixteen pixels necessary for generation of a pixel at an upper right corner of the first corrected pixel group and an uncorrected pixel group consisting of sixteen pixels necessary for generation of a pixel at a lower right corner of the first corrected pixel group. The simple address generation unit 105 determines a rectangle including the two specified uncorrected pixel groups, the uncorrected pixel group 413, and the uncorrected pixel group 415 as the uncorrected pixel range necessary for generation of the first corrected pixel group. Incidentally, the rectangle is desirably a rectangle with a predetermined margin provided outside the minimum rectangle including the two specified uncorrected pixel groups, the uncorrected pixel group 413, and the uncorrected pixel group 415.

Figure 5:
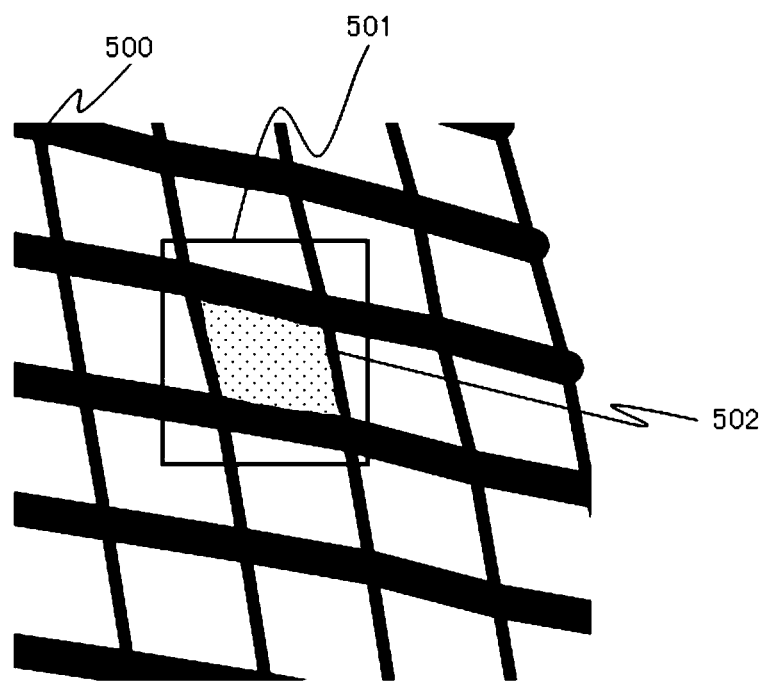
FIG. 5 is an explanatory view illustrating an example of distortion characteristics of a lens according to the first embodiment.

FIG. 5 illustrates an example of the distortion characteristics of the lens. An image 500 is an uncorrected image of a lattice vertically and horizontally at regular intervals which has been stored on the memory 102. FIG. 5 is an example in which conversion by enlargement, reduction, rotation, and shearing is omitted for the sake of simplicity.

An uncorrected pixel range 501 is a range of uncorrected pixels, necessary for generation of a corrected pixel corresponding to a rectangle 502 in the lattice, which is determined by the above-described method. Incidentally, a shape of the uncorrected pixel range 501 varies depending on the distortion characteristic. The lens characteristic may also vary depending on a position on an image. In this case, the shape and size of the uncorrected pixel range 501 also vary depending on the position on the image.

Figure 6A:
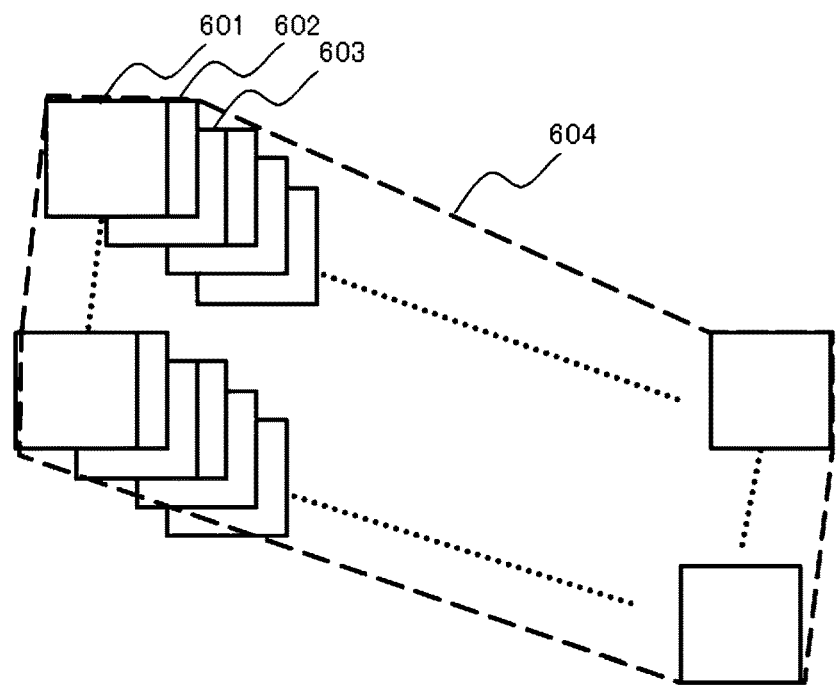
FIG. 6A is an explanatory view illustrating a comparative example of reading of an uncorrected pixel by a conventional cache system.

FIG. 6A is an explanatory view illustrating a comparative example of reading of uncorrected pixels from the memory 102 by a conventional cache system. The conventional cache system predicts uncorrected pixels on the memory 102, necessary for generation of a corrected pixels, for each of uncorrected pixel in a corrected pixel group and reads a shortage thereof into the cache.

Each of uncorrected pixel ranges 601 to 603 is a range of uncorrected pixels corresponding to one-time reading from the memory 102 in the conventional cache system. That is, each of the uncorrected pixel ranges 601 to 603 is sequentially read into the cache in order to generate one corrected pixel corresponding to the uncorrected pixel range. An uncorrected pixel range 604 is a pixel range of uncorrected pixels necessary for generation of the predicted corrected pixel group in the conventional cache system.

Figure 6B:
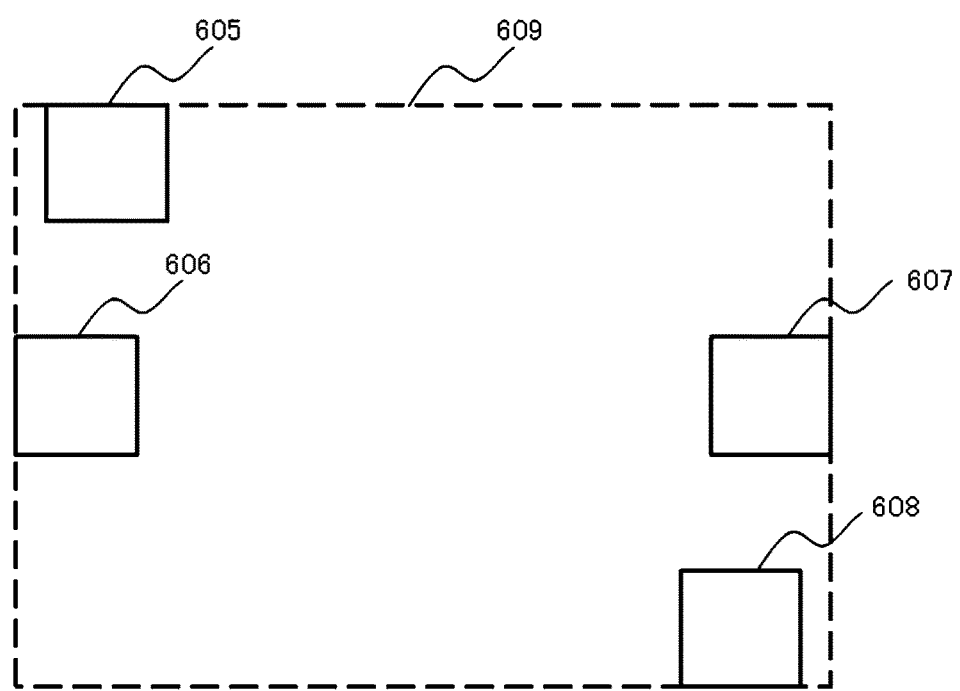
FIG. 6B is an explanatory view illustrating an example of reading of an uncorrected image using a cache system according to the first embodiment.

FIG. 6B is an explanatory view illustrating an example of reading an uncorrected image from the memory 102 according to a cache system of the present embodiment. Each of uncorrected pixel ranges 605 to 608 is an uncorrected pixel group necessary for generation of each of pixels at four corners of a rectangular corrected pixel group. An uncorrected pixel range 609 is a rectangular uncorrected pixel range including the uncorrected pixel ranges 605 to 608. As described above, the cache system of the present embodiment is different from the conventional cache system in terms that the uncorrected pixel range 609 is determined only using the pixels necessary for generation of the pixels at the four corners of the corrected pixel group. Therefore, shapes and sizes of the uncorrected pixel range 604 and the uncorrected pixel range 609 are different from each other.

Second Embodiment

In the present embodiment, an example in which a unit of processing of the distortion correction and color restoration unit 106 is sixteen pixels of 4 pixels×4 pixels will be described. Only the changes from the first embodiment will be described.

Hereinafter, a description will be given regarding an example of a method of calculating an uncorrected pixel range on a memory, necessary for generation of a corrected pixel group, according to the second embodiment.

Figure 7A:
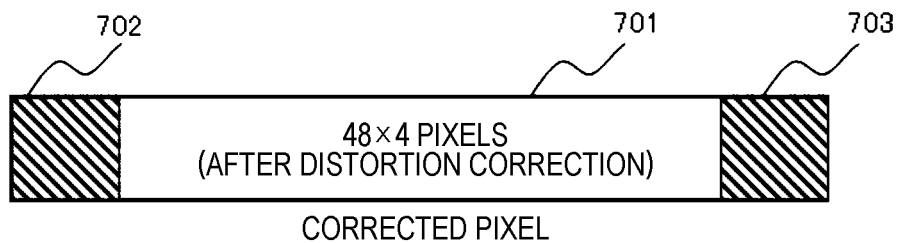
FIG. 7A is an example of a pixel group of a corrected image according to a second embodiment.

FIG. 7A is an example of the pixel group of the corrected image. A corrected pixel group 701 is, a corrected pixel group 701 is a rectangular pixel group consisting of 48×4 pixels of a corrected image. A corrected pixel group 702 is a pixel group of one unit of processing (4×4 pixels) positioned at a left end of the corrected pixel group 701. A corrected pixel group 703 is a pixel group of one unit of processing positioned at a right end of the corrected pixel group 701.

Figure 7B:
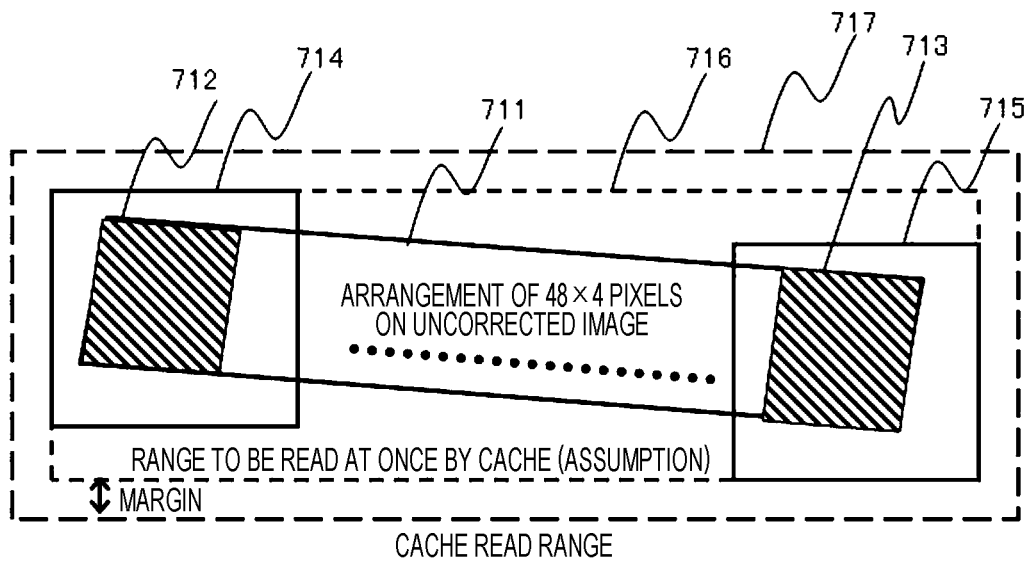
FIG. 7B is an example of a pixel range of an uncorrected image necessary for generation of a corrected pixel group according to the second embodiment.

FIG. 7B illustrates an example of the pixel range of the uncorrected image necessary for generation of the corrected pixel group 701. The corrected pixel group 701 corresponds to a region 711 of the uncorrected image on the memory 102 according to the conversion characteristics depending on the lens distortion, the inclination of the camera, and the like. Similarly, the corrected pixel group 702 corresponds to a region 712 of the uncorrected image, and the corrected pixel group 703 corresponds to a region 713 of the uncorrected image. An uncorrected pixel range 714 is a range of uncorrected pixels necessary for generation of the corrected pixel group 702. An uncorrected pixel range 715 is a range of uncorrected pixels necessary for generation of the corrected pixel group 703.

For example, the simple address generation unit 105 determines the uncorrected pixel range 714 as follows. For each of corrected pixels of the corrected pixel group 702, the simple address generation unit 105 specifies an uncorrected pixel having coordinates made up of integer parts of an x coordinate and a y coordinate of a position of the uncorrected image corresponding to the corrected pixel. Incidentally, for each of the uncorrected pixels at four corners of the corrected pixel group 702, the simple address generation unit 105 may specify an uncorrected pixel having coordinates made up of integer parts of an x coordinate and a y coordinate of a position of the uncorrected image corresponding to the corrected pixel.

The simple address generation unit 105 specifies a square consisting of sixteen peripheral pixels for each of the specified uncorrected pixels by the method illustrated in FIG. 3, and determines the smallest rectangle including all the specified squares as the uncorrected pixel range 714. The same description is also applied to a method of specifying the uncorrected pixel range 715.

For example, when a lens distortion characteristic is a mapping from a quadrilateral to a quadrilateral, the cache unit 104 reads pixels in a rectangular uncorrected pixel range 716, which includes the uncorrected pixel ranges 714 to 715. A method of calculating an address of the uncorrected pixel range 716 by the simple address generation unit 105 is the same as the method of determining the address of the uncorrected pixel range 416 in the first embodiment.

In addition, if the distortion characteristic is not the simple mapping from the quadrilateral to the quadrilateral mapping but contains barrel-shaped distortion, the cache unit 104 reads a rectangular uncorrected pixel range 717 obtained by adding a predetermined margin to the outside of the uncorrected pixel range 716.

With the above-described processing, the cache unit 104 can pre-read the uncorrected pixels necessary to allow the distortion correction and color restoration unit 106 to generate all the pixels included in the corrected pixel group 401 regardless of the size of the unit of processing. In addition, the simple address generation unit 105 can determine the uncorrected pixel group to be pre-read with a small amount of calculation.

Incidentally, the present invention is not limited to the above-described embodiments and includes various modification examples. For example, the above-described embodiments have been described in detail in order to describe the present invention in an easily understandable manner, and are not necessarily limited to those including the entire configuration that has been described above. In addition, some configurations of a certain embodiment can be substituted by configurations of another embodiment, and further, a configuration of another embodiment can be also added to a configuration of a certain embodiment. Further, addition, deletion or substitution of other configurations can be made with respect to some configurations of each embodiment.

In addition, a part or all of each of the above-described configurations, functions, processing units, processing means, and the like may be realized, for example, by hardware by designing with an integrated circuit and the like. In addition, each of the above-described configurations, functions, and the like may also be realized by software by causing a processor to interpret and execute a program for realizing each of the functions. Information such as programs, tables, and files that realize the respective functions can be installed in a recording device such as a memory, a hard disk, and a solid state drive (SSD), or a recording medium such as an IC card, an SD card, and a DVD.

In addition, only control lines and information lines considered to be necessary for the description have been illustrated, and all of the control lines and information lines required as a product are not necessarily illustrated. It may be considered that most of configurations are practically connected to each other.

The invention claimed is:

1. An image processing apparatus that determines a second pixel range of an uncorrected image necessary for generating a first pixel range consisting of pixels in a preset range of a corrected image, the image processing apparatus comprising:
   a memory that holds the uncorrected image;
   a cache unit that determines the second pixel range, reads the second pixel range from the memory, and holds the read second pixel range; and
   a correction processing unit that acquires the second pixel range from the cache unit and executes correction on the acquired second pixel range to generate the first pixel range, wherein
   correspondences indicating positions of the uncorrected image corresponding to positions of pixels of the corrected image, respectively, are preset,
   the first pixel range is a rectangle, and
   the third pixel range is the first pixel range, and
   the cache unit
   specifies a position of the uncorrected image corresponding to a pixel at one of four corners of a rectangular third pixel range including the first pixel range, based on the correspondence,
   specifies pixel ranges of the uncorrected image necessary for generation of pixel values of pixels, respectively, at the four corners of the third pixel range, based on the specified position,
   determines a pixel range that includes a convex set including all the specified pixel ranges as the second pixel range,
   reads the second pixel range from the memory before executing the correction by the correction processing unit,
   holds first information that indicates a pixel range of the uncorrected image necessary for generation of pixel values of adjacent pixels of a rectangular fourth pixel range that is adjacent to the first pixel range and shares one side having an identical length with the first pixel range, the adjacent pixels being pixels positioned at end points of the one side, and
   specifies a position of the uncorrected image corresponding to one pixel, which is not adjacent to the adjacent pixels, among the pixels at the four corners of the third pixel range, based on the correspondence, wherein
   a pixel range of the uncorrected image necessary for generation of a pixel value of pixels, which are adjacent to the adjacent pixels, among the pixels at the four corners of the third pixel range, is the pixel range indicated by the first information.

2. The image processing apparatus according to claim 1, wherein
   the convex set is a minimum rectangle including all the specified pixel ranges, and
   the pixel range that includes the convex set is a rectangle having a predetermined margin outside the convex set.

3. The image processing apparatus according to claim 1, wherein
   the first pixel range is a pixel range in which a plurality of fifth pixel ranges is arranged in a one-dimensional direction,
   each of the plurality of fifth pixel ranges is a rectangular pixel range consisting of a plurality of pixels,
   the fifth pixel ranges adjacent within the first pixel range share a side with each other, and
   the cache unit
   specifies a pixel range of the uncorrected image necessary for generation of pixel values of each of the fifth pixel ranges positioned at both ends in the first pixel range, based on the specified position.

4. The image processing apparatus according to claim 1, wherein
   the correspondence reflects at least one of a distortion characteristic of a lens of a camera capturing the uncorrected image and an installation condition of the camera, and
   the correction includes at least one of distortion correction, enlargement, reduction,
   rotation, shearing, and translation in the second pixel range.

5. An image processing method of an image processing apparatus that determines a second pixel range of an uncorrected image necessary for generating a first pixel range consisting of pixels in a preset range of a corrected image, wherein
the image processing apparatus includes:
a memory that holds the uncorrected image;
a cache unit that determines the second pixel range, reads the second pixel range from the memory, and holds the read second pixel range; and
a correction processing unit that acquires the second pixel range from the cache unit and executes correction on the acquired second pixel range to generate the first pixel range,
correspondences indicating positions of the uncorrected image corresponding to positions of pixels of the corrected image, respectively, are preset,
the first pixel range is a rectangle, and
the third pixel range is the first pixel range, and
in the image processing method, the cache unit
specifies a position of the uncorrected image corresponding to a pixel at one of four corners of a rectangular third pixel range including the first pixel range based on the correspondence,
specifies pixel ranges of the uncorrected image necessary for generation of pixel values of pixels, respectively, at the four corners of the third pixel range based on the specified position,
determines a pixel range that includes a convex set including all the specified pixel ranges as the second pixel range,
reads the second pixel range from the memory before executing the correction by the correction processing unit,
holds first information that indicates a pixel range of the uncorrected image necessary for generation of pixel values of adjacent pixels of a rectangular fourth pixel range that is adjacent to the first pixel range and shares one side having an identical length with the first pixel range, the adjacent pixels being pixels positioned at end points of the one side, and
specifies a position of the uncorrected image corresponding to one pixel, which is not adjacent to the adjacent pixels, among the pixels at the four corners of the third pixel range, based on the correspondence, wherein
a pixel range of the uncorrected image necessary for generation of a pixel value of pixels, which are adjacent to the adjacent pixels, among the pixels at the four corners of the third pixel range, is the pixel range indicated by the first information.

6. The image processing method according to claim 5, wherein
the convex set is a minimum rectangle including all the specified pixel ranges, and
the pixel range that includes the convex set is a rectangle having a predetermined margin outside the convex set.

7. The image processing method according to claim 5, wherein
the first pixel range is a pixel range in which a plurality of fifth pixel ranges is arranged in a one-dimensional direction,
each of the plurality of fifth pixel ranges is a rectangular pixel range consisting of a plurality of pixels,
the fifth pixel ranges adjacent within the first pixel range share a side with each other, and
the cache unit
specifies a pixel range of the uncorrected image necessary for generation of pixel values of each of the fifth pixel ranges positioned at both ends in the first pixel range based on the specified position.

8. The image processing method according to claim 5, wherein
the correspondence reflects at least one of a distortion characteristic of a lens of a camera capturing the uncorrected image and an installation condition of the camera, and
the correction includes at least one of distortion correction, enlargement, reduction, rotation, shearing, and translation in the second pixel range.

\* \* \* \* \*